United States Patent
Oetiker

(10) Patent No.: US 6,702,333 B1
(45) Date of Patent: Mar. 9, 2004

(54) ANTI-VIBRATION PLUG-IN NIPPLE

(75) Inventor: Hans Oetiker, Horgen (CH)

(73) Assignee: Hans Oetiker AG Maschinen-und Apparatefabrik, Horgen (CH)

( * ) Notice: Subject to any disclaimer, the term of this patent is extended or adjusted under 35 U.S.C. 154(b) by 0 days.

(21) Appl. No.: 09/806,363

(22) PCT Filed: Sep. 13, 1999

(86) PCT No.: PCT/CH99/00429

§ 371 (c)(1),
(2), (4) Date: Jun. 28, 2001

(87) PCT Pub. No.: WO00/20791

PCT Pub. Date: Apr. 13, 2000

(51) Int. Cl.⁷ .................................................. F16L 11/12
(52) U.S. Cl. .......................... 285/49; 285/235; 285/237
(58) Field of Search ............................... 285/45, 48, 49, 285/235, 237

(56) References Cited

U.S. PATENT DOCUMENTS

| | | | | |
|---|---|---|---|---|
| 3,190,680 A | * | 6/1965 | Maly | 285/49 |
| 3,406,783 A | * | 10/1968 | Haffer | 285/49 X |
| 3,936,078 A | * | 2/1976 | Wallyn | 285/49 |
| 4,198,078 A | * | 4/1980 | Herbert | 285/49 |
| 4,278,276 A | * | 7/1981 | Ekman | 285/49 |

FOREIGN PATENT DOCUMENTS

| | | | |
|---|---|---|---|
| CH | 518 481 | 3/1972 | |
| DE | 888 786 | 1/1972 | |
| DE | 3744416 | * 7/1989 | 285/45 |

* cited by examiner

*Primary Examiner*—David Bochna
(74) *Attorney, Agent, or Firm*—Pearne & Gordon LLP

(57) ABSTRACT

A device for connecting a pneumatically or hydraulically operated tool to a connection coupling in order to provide the connection to a transport line which guides a liquid or gaseous medium. The device includes a first part (11) with an engaging section (13) which is provided so that it can be inserted into a receiving element on the connection coupling and therefore be detachably connected with the same. The device also has a second part (3) with a connecting section (5), which is configured for being permanently connected to the tool. The two parts (3, 11) each have at least one additional section (9, 17), one of the additional sections (9) radially, externally surrounding the other, at a distance, and an elastic connection (19) being provided between the two additional sections. The connection can be produced by casting, injecting or extruding an elastic, rubber-type material between the two sections.

9 Claims, 2 Drawing Sheets

ANTI-VIBRATION PLUG-IN NIPPLE

BACKGROUND OF THE INVENTION

This invention relates to a device for connecting a pneumatic or hydraulic tool to a coupling, linking it with a liquid- or gaseous-fluid feed line; a fitting designed to cushion the pulsations, vibrations and mechanical shocks of percussion tools; and a method for cushioning or absorbing pulsations, vibrations and mechanical shocks in the operation of pneumatic or hydraulic percussion and/or vibrating tools.

Fittings are used in conjunction with couplings which serve as detachable interconnecting elements between rigid pipes and flexible conduits for fluids, i.e. liquid or gaseous substances, especially compressed air. Pneumatic or hydraulic tools such as impact, percussion or vibrating tools which are driven by pneumatic or hydraulic fluids such as compressed air, are connected to and disconnected from their respective feed lines via the aforementioned intermediate couplings. Examples of compressed-air-driven tools include road-construction equipment or pneumatic tools for tightening and/or removing automobile wheel nuts and studs etc., in all cases involving the transfer of strong vibrational forces, pulsating or hammering action from the percussion tool by way of the rigid connecting line to the coupling in which coupling the fitting is securely fastened. A contact surface of the fitting protrudes into a mating port in the coupling where it can be releasably locked in position either via a screw-collar or bayonet-type clamp or by a swivel or twist-lock mechanism in the coupling.

The manufacturers of quick-connect couplings and fittings take for granted that the users view these couplings and fittings merely as connectors subject to wear and tear and, hence, to periodic replacement. Their useful lifespan is limited as a function of the product and material quality, and the user still reviews only the cost/benefit ratio of his investment in couplings and fittings. Yet our experience in the most diverse fields of application of couplings and fittings has provided ample evidence to the effect that connectors of this type are predominantly used for feeding compressed air to pneumatic tools and frequently so-called vibrating screwdrivers, wrenches and hammers. The associated above-average wear, however, is ignored by the typical user until the coupling fails to function. In most cases, such failure exhibits itself in that detachable couplings come apart by themselves, whereby the two connecting elements, for instance a coupling and a fitting in the case of a flexible conduit, become uncontrollable, separating with a so-called whiplash effect as a result of the sudden compressed-air blowout and flying off with a corresponding velocity. This has led to accidents with the gravest consequences for those directly involved, for which the manufacturers of the couplings and fittings as well may be held liable.

At this juncture, work with compressed air is the subject of certain national and international regulations whereby a coupling must meet specific safety standards in terms of its connecting and disconnecting properties before it can be marketed as a so-called safety coupling. There is no comparable regulation, however, regarding the physical design of such connectors especially with respect to technical provisions aimed at preventing premature wear and tear of the locking elements which easily goes unnoticed by the non-expert.

Prior art has attempted to address this problem by interpositioning between the fitting and the connecting port on the tool a flexible tube section, but the configuration of the flexible conduit and its attachment to the fitting and, respectively, to the tool port turned out to be so complex and costly that this approach never really materialized.

There has also been a two-part fitting with an elastic, shock-attenuating intermediate layer which elastic layer is surrounded by a sleeve shrunk onto the elastomer material for generating radial inward pressure. In practice, this design has quickly led to fatigue or embrittlement of the elastomer material, causing the fitting to break apart.

Then there is Swiss patent CH 518.481 which describes an anti-vibration device intended to cushion the pulsations in a fluid-transmitting line. That document refers to the attenuation of pulsations in liquid-carrying lines which again fails to provide a suitable solution for a fitting or junction that connects a fluid line to a tool. Besides, the document describes a stepped through-hole which is hardly desirable in a fluid line.

SUMMARY OF THE INVENTION

It is therefore the objective of this invention to introduce a system by means of which the aforementioned pulsations, vibrations and hammering action are cushioned or absorbed so as not to be transferred to the interconnecting coupling, causing the fitting to break out of the coupling.

Specifically, the invention is aimed at providing a so-called "anti-vibration fitting" whose basic physical design is such as to allow the transfer to the coupling of either none or only highly cushioned movements from the percussion- or vibration-type compressed-air tool. In the absence of vibrations or percussions at the coupling, the locking elements of the coupling are not constantly exposed to excessive shock loads and thus to extraordinary wear which would normally be noticed only after the connection, presumed by the user to be safe, starts to leak or even comes apart.

The device proposed is a so-called nipple-type fitting which serves to connect a pneumatic or hydraulic tool, especially for instance a percussion or vibration tool, to a coupling which links it with a liquid- or gaseous-fluid-carrying feeder or supply line, whereby the said device or fitting incorporates at least one first part with a protruding contact section which can be inserted or plugged into and thus releasably connected to a mating port in the coupling. A second part, incorporating a connector section, is so designed and provided as to permit solid connection to and with the tool. Both parts include at least one additional section each whereby the additional section of one part radially surrounds that of the other part with a space in between and an elastic junction is provided in that space between the two sections, which junction is produced by casting, injection-molding, extruding and/or, where appropriate, by reactive cross-linking or by vulcanizing an elastic, rubber-like material or thermosetting an elastic polymer between the two additional sections.

The device introduced by this invention is particularly suitable as a so-called anti-vibration fitting for connecting percussion tools such as pneumatic tools to quick-connect couplings. An anti-vibration fitting of this type essentially consists of two metal parts where one part is designed to attach firmly to the percussion tool while the other metal part, nipple-shaped, is so designed that it can be inserted and locked in the quick-connect coupling. Interpositioned between the two metal parts is a layer of an elastomer material or a vulcanized rubber serving to absorb or cushion vibrations or pulsations originating from the percussion tool.

By predefining a specific Shore hardness the degree of attenuation between the percussion tool and the quick-connect coupling can be selected.

The anti-vibration fitting described above extends the life of the unions since the locking elements are exposed to a certain impact only when being connected or disconnected, which is tantamount to normal wear. The fitting described is generally suitable for all and any existing union and coupling systems since the nipple end of the fitting can be adapted to whatever connecting system is employed.

In producing the device per this invention, or anti-vibration fitting just described, it is possible to provide each of the two metal parts with a cylindrical or sleeve-type section, with one sleeve-type section radially enveloping the other section. The space left between the two sleeve-type sections can now be filled with the elastomer material or rubber which is introduced by casting or injection-molding and which, if desired, can then be vulcanized to a particular Shore hardness. Alternatively, the inner sleeve-type or cylindrical section can be jacketed with the elastomer material or rubber by the extrusion method, after which the other section is slipped over it. In this case as well it is possible, where appropriate, either by heat-treating or by other suitable measures to produce a partial cross-linking or vulcanization effect in the elastomer or rubber material for arriving at a particular Shore hardness.

BRIEF DESCRIPTION OF THE SEVERAL VIEWS OF THE DRAWINGS

The following examples will explain this invention in more detail, with reference to the attached drawings in which.

DETAILED DESCRIPTION OF THE INVENTION

Figure 1:
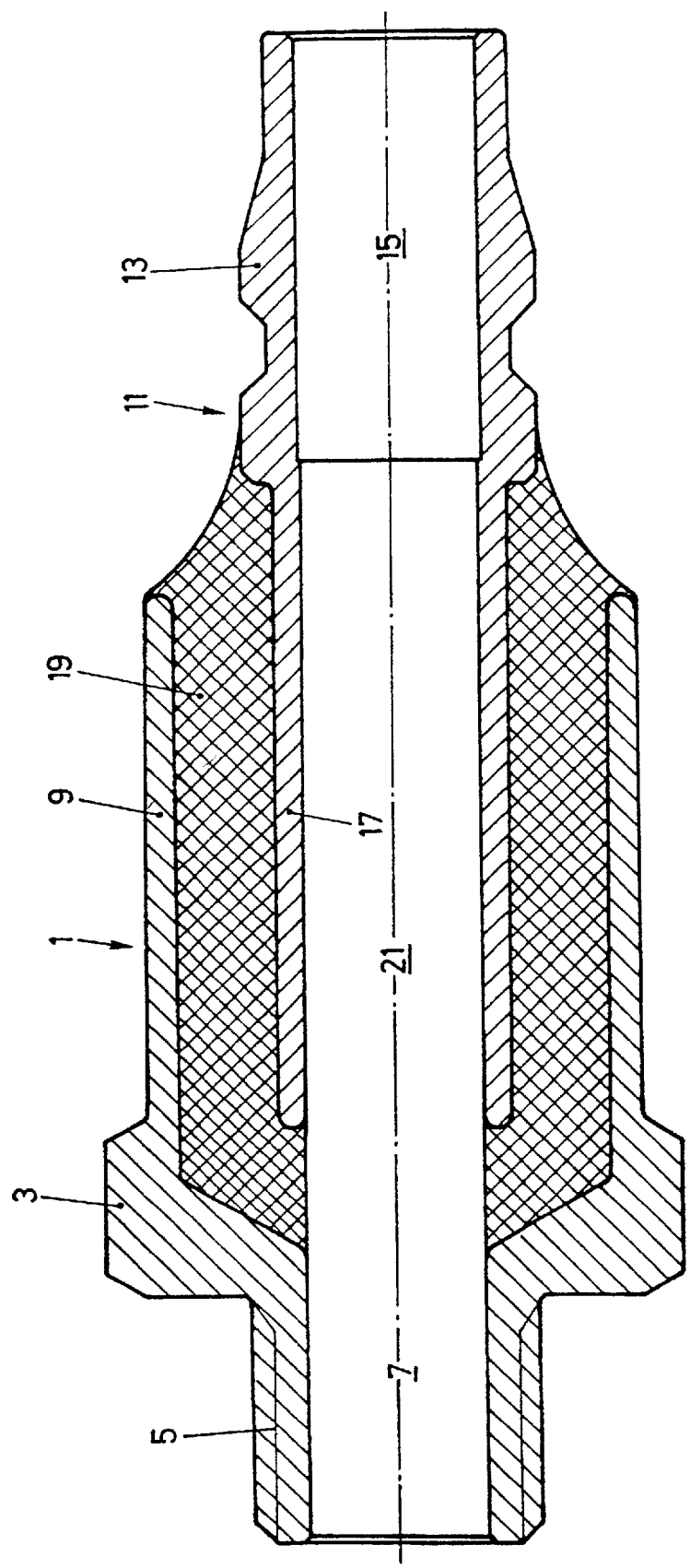
FIG. 1 is a longitudinal cross-sectional view of the device and interconnecting fitting per this invention.

The longitudinal sectional view in FIG. 1 illustrates a device per this invention, i.e. an anti-vibration fitting 1 suitable for connecting a hydraulic or pneumatic tool to a coupling which serves to connect the tool with a feed or supply line carrying the liquid or gaseous fluid that drives the tool.

The fitting 1 per this invention incorporates a connector part 3 which is provided with a connector section 5 that is designed to attach to the tool. That section 5 may be of the threaded, bayonet-mount, snap-lock or similar type by means of which the fitting 1 is solidly attached to the tool. The connector part 3 is also provided with a sleeve-like or cylindrical section 9 which surrounds the outside of an inner, cylindrical section 17 that extends from the plug end 11. The plug end 11 also features a nipple-shaped adapter section 13 designed to permit insertion in a recess or housing port of the coupling. The adapter i.e. nipple section 13 is so configured that it can be held in place by means of locking elements in the recess or coupling housing port. The method of locking the fitting in the coupling will not be discussed in detail at this point since there exist various coupling designs which permit a firm, releasable connection between the fitting and the coupling by different means, e.g. plug collar, snap-, swivel- or twist-lock, bayonet-type mount or the like.

The important aspect of this invention is that the two cylindrical or sleeve-shaped sections, with a circular or again cylindrical space between them, are connected with each other via an elastomeric material, i.e. an elastomer layer 19. This elastomer layer, consisting of an elastomeric polymer or a rubber-like material, is capable of at least partially absorbing or cushioning vibrations, pulsations or hammering action transferred from the tool via the connector section 5 to the fitting 1. This prevents the hammering action or vibrations from propagating from the tool via the adapter section 13 to the coupling, which could otherwise cause damage to the coupling, resulting in a leaky connection between the fitting 1 and the coupling and ultimately even in the accidental separation of the adapter section 13 from the coupling.

Figure 2:
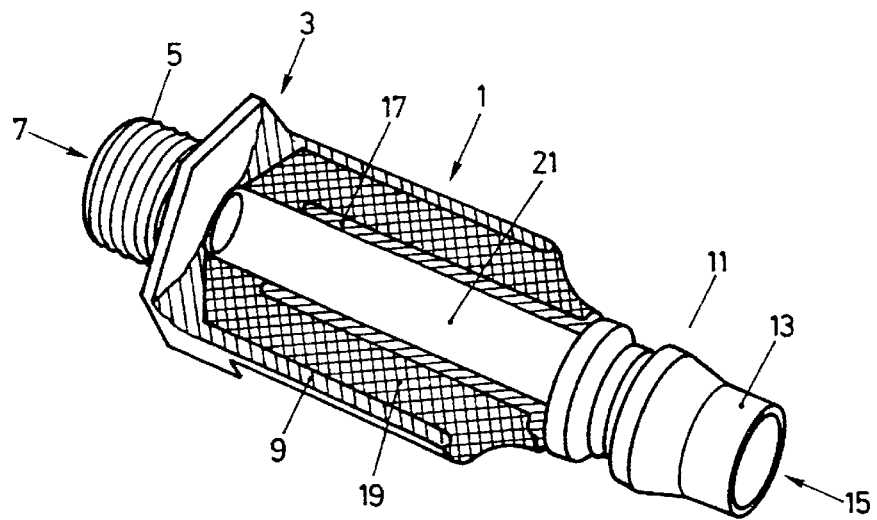
FIG. 2 shows, with a partial cut-away view, an example of a practical embodiment of the anti-vibration fitting analogous to the design per FIG. 1.

FIG. 2 illustrates a practical embodiment of an anti-vibration fitting 1 per this invention, with components analogous to those in FIG. 1 bearing the same reference numbers. Clearly visible between the two cylindrical or sleeve-shaped sections 9 and 17 is the elastomer or rubber-like material 19 serving to cushion or absorb the hammering action or vibrations. Equally visible is the central bore 21 which extends throughout the anti-vibration fitting 1 from the opening 7 in the connector section 5 to the opening 15 in the adapter section 13. Through this bore passes the hydraulic or pneumatic fluid that drives the tool.

The anti-vibration fitting 1 per FIG. 2 may consist for instance of two metal parts 3 and 11 as well as a vulcanized rubber layer of a predefined Shore hardness of perhaps 50 to 55. In its connector section 5, the metal part 3 is provided with an external or internal thread which is screwed onto or into the correspondingly threaded port of the tool. The other metal part, 11, is composed of the inner sleeve-like or cylindrical part 17 and of the distal nipple-shaped adapter end 13. Both parts are firmly but flexibly connected with each other, thus preventing vibrations and/or mechanical shocks from being transmitted to the coupling. The design described avoids an overexposure of the anti-vibration fitting to lateral forces. The combination of the quality of the elastomer or rubber material employed, the Shore hardness selected and the overall length of the anti-vibration fitting determines the capacity of the device as a so-called. shock absorber between the tool and the coupling.

Figure 3:
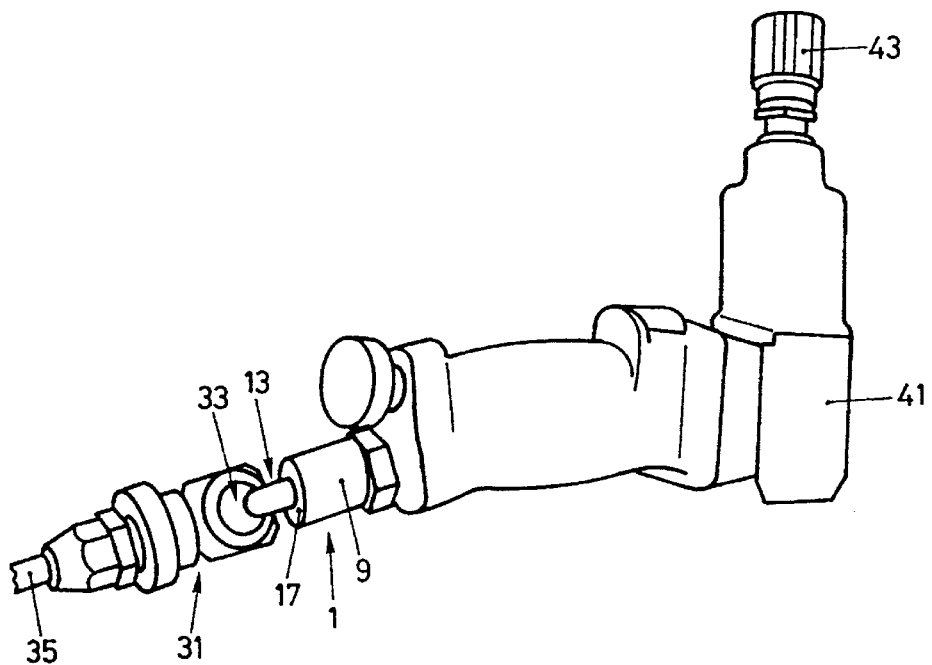
FIG. 3 is a schematic, perspective view of a percussion tool attached to a quick-connect coupling by means of an anti-vibration fitting per this invention.

For a better visualization of this invention, FIG. 3 is a perspective illustration of a percussion tool connected to a quick-connect coupling. In this example, the pneumatic tool 41 may be an impact wrench with a percussion-type screw-driving mechanism 43 for mounting automobile wheel nuts. The tool connects to the anti-vibration fitting 1 illustrated in FIG. 2 and incorporating the two sleeve-like or cylindrical sections 9 and 17 which are connected with each other for instance via the rubber material installed by vulcanization.

The anti-vibration fitting 1 connects to a quick-connect coupling 31 via the adapter section 13. The fitting is held in place in the coupling housing 33 by means of appropriate locking elements. In the example of the quick-connect coupling 31 illustrated in FIG. 3, the design is that of a swivel coupling in which case the fitting enters the coupling housing 33 perpendicular to the longitudinal axis of the coupling and is then swiveled 90°, whereby the locking elements hold the fitting in place in an axial position. After the locking process the fluid in the feed line 35, such as compressed air, can pass through to the pneumatic tool.

Vibration tests were conducted in which conventional fittings, both with and without shock-absorbing or attenuating provisions, were compared with anti-vibration fittings per this invention. Fittings without attenuating provisions were defective, or leaking seriously enough to be rendered unusable, after as little as 125 hours. Fittings with attenuating provisions per prior art, i.e. with shrink-collar-clad elastomer material, were defective or unusable after 134 hours. While fittings without attenuating provisions displayed leaks within the coupling housing due to worn locking elements, the shock load applied in the tests on fittings with attenuating provisions led to breaks in the flexible material.

In contrast thereto, the vibration tests on the anti-vibration fittings per this invention were stopped after 210 hours without any leaks having been discovered.

The description given with reference to FIGS. 1 to 3 is merely intended to serve for a better visualization of this invention, representing only one example of a possible form of implementation without in any way limiting the scope of this invention. Especially the quick-connect coupling per FIG. 3 is shown solely as an example of how a fitting according to this invention can be connected to the coupling. Similarly, the design of the fitting or anti-vibration fitting per this invention can be altered, modified or complemented in any desired fashion. In particular, for producing the elastic, shock attenuating or absorbing layer the most diverse elastomers can be used, such as different elastomeric polymers or rubber-like materials similar to the above-mentioned, preferred rubber materials applied by vulcanization. Even the choice of material used for the parts connected via the elastomer material can be made in essentially arbitrary fashion from among stainless steel, aluminum or other suitable materials. The important feature of the fitting per this invention is that the elastic material connecting the two rigid parts is not forcibly applied for instance by shrink-mounting a metal ring or a metal sleeve over it but is obtained by casting, injection-molding or extruding the elastomer material or rubber and, where practical, subsequently treating or applying it by vulcanization or partial cross-linking.

What is claimed is:

1. Anti-vibration fitting (1) for connecting a percussion-type of vibrating pneumatic or hydraulic tool with an intermediate coupling, characterized by at least one first part (11) provided with an adapter section (13) designed to permit insertion in and releasable connection with a port (33) in the coupling, a second part (3) featuring a connector section (5) for rigid connection with the tool, with each of the said two parts (3, 11) featuring at least one additional section (9, 17) of which one additional section (9) radially surrounds another additional section (17) with a space in between in which interstitial space an elastic junction layer (19) is provided, said layer being produced by at least one of casting, injection-molding, extruding, and reactively cross-linking an elastic material between the two sections, and with a through-hole between the two parts (3, 11) being in the form of a smooth bore comprising an end of a first bore section in the first part, a second bore section in the elastic junction layer, and an end of a third bore section in the second part.

2. Device as in claim 1, characterized in that said two additional sections are sleeve-shaped or cylindrical, an inner cylinder or sleeve (17) having a smaller diameter and an outer sleeve or cylinder (9) having a larger diameter whereby it partly or fully surrounds the inner cylinder or sleeve.

3. Device as in claim 2, characterized in that the inner cylinder or sleeve having the smaller diameter constitutes the additional section (17) of the first part (11).

4. Device as in claim 2, characterized in that the outer sleeve or cylinder having the larger diameter constitutes the additional section of the second part.

5. Device as in claim 1, characterized in that the elastic material is an elastomeric polymer.

6. Device as in claim 1, characterized in that the elastic material is a rubber having properties similar to caoutchouc.

7. Device as in claim 1, characterized in that the elastic material is at least in part at least one of cross-linked and applied by vulcanization.

8. Device as in claim 1, characterized in that the intermediate coupling comprises a quick-connect coupling suitable for linking the tool with a liquid- or gaseous-fluid-carrying feed line.

9. Method for producing an anti-vibration fitting for connecting a percussion-type of vibrating pneumatic or hydraulic tool with an intermediate coupling, characterized by at least one first part (11) provided with an adapter section (13) designed to permit insertion in and releasable connection with a port (33) in the coupling, a second part (3) featuring a connector section (5) for rigid connection with the tool, with each of the said two parts (3, 11) featuring at least one additional section (9, 17) of which one additional section (9) radially surrounds another additional section (17) with a space in between in which interstitial space an elastic junction layer (19) is provided, said layer being produced by at least one of casting, injection-molding or extruding and, reactively cross-linking an elastic material between the two sections, and with a through-hole between the two parts (3, 11) being in the form of a smooth bore comprising an end of a first bore section in the first part, a second bore section in the elastic junction layer, and an end of a third bore section in the second part.

* * * * *